United States Patent [19]

Kirkendall

[11] Patent Number: 5,187,512
[45] Date of Patent: Feb. 16, 1993

[54] FILM CASSETTE CONTAINING PRE-EXPOSED FILM

[75] Inventor: George F. Kirkendall, Cohasset, Mass.

[73] Assignee: Polaroid Corporation, Cambridge, Mass.

[21] Appl. No.: 780,056

[22] Filed: Oct. 21, 1990

[51] Int. Cl.[5] ............................................. G03B 1/00
[52] U.S. Cl. .................................................... 354/120
[58] Field of Search ............... 354/108, 110, 111, 122, 354/125, 126, 291, 295, 100, 103, 120; 352/46, 55, 90, 87; 355/39

[56] References Cited

U.S. PATENT DOCUMENTS

| | | | |
|---|---|---|---|
| 3,815,147 | 6/1974 | Wick et al. | 354/275 |
| 4,310,232 | 1/1982 | Reed | 354/125 |
| 4,427,279 | 1/1984 | Edelstein et al. | 354/107 |
| 4,655,570 | 4/1987 | Jaffe | 354/107 |
| 4,707,106 | 11/1987 | Johnson et al. | 354/481 |
| 4,801,957 | 1/1989 | Vandemoere | 354/288 |
| 4,816,848 | 3/1989 | Doyle | 354/108 |
| 4,827,291 | 5/1989 | Guez | 354/125 |
| 4,896,176 | 1/1990 | Barrett | 354/122 |
| 4,994,832 | 2/1991 | Spector | 354/110 |
| 5,142,311 | 8/1992 | Olson et al. | 354/120 |

Primary Examiner—Michael L. Gellner
Assistant Examiner—David M. Gray
Attorney, Agent, or Firm—Alfred E. Corrigan

[57] ABSTRACT

During manufacture each frame of a film strip has one portion masked while the frame is exposed to light. Said light impinges on a second portion of the frame to form a latent image. The film strip is mounted within a camera where the previously unexposed portion of the frame is exposed to a second image bearing light while the pre-exposed portion of the frame is masked from said second light, the strip of film is removed from the camera to develop the two latent images as a single photograph.

15 Claims, 4 Drawing Sheets

FILM CASSETTE CONTAINING PRE-EXPOSED FILM

BACKGROUND OF THE INVENTION

Related Application

This application is related to application Ser. No. 726,761 entitled Film Assemblage With Pre-Exposed Film and Method for Forming the Same by Carl L. Olson et al. filed Jul. 8, 1991 now U.S. Pat. No. 5,142,311.

Field of the Invention

This invention relates to apparatus and processes for pre-exposing only certain portions of the frames of a film strip before the strip is exposed in a camera. After the film is mounted in the camera, each frame is exposed to image bearing light for a second time. Pre-exposed portions of the frames are masked from the subsequent exposure when the film is exposed within the camera.

Description of the Prior Art

Numerous techniques have been developed for getting two or more exposure on a single film frame, each exposure being directed to a particular portion of the film unit to thereby provide special indicia, background scenes and/or diverse subject matter. This basic concept is not new. Representative background photographic techniques in this field are discussed below.

A U.S. Pat. No. to Reed, 4,310,232, discloses making two exposures of the same film unit while it is in place within a camera. One of the exposures involves a background transparency overlying the film unit to provide the background desired. The other exposure involves an object before the camera. The inherent problem is aligning the subject of the second exposure with the unexposed portion of the film frame at the second exposure.

A U.S. Pat. No. to Edelstein et al., 4,427,279, discloses camera structure to provide two exposures of a single film unit. Light to effect the two exposures is channeled to different sections of the film unit from two different sources. One exposure is through a lens and shutter system and the other is by way of an internally structured light source directing light to the film unit through a slide which provides indicia or other instructional information on a portion of the exposed film unit. Both exposures take place simultaneously inside the same camera.

A U.S. Pat. No. to Jaffe, 4,655,570, is similar to the patent to Edelstein et al. mentioned above in that it divides each film unit into two sections. Each patent provides an internally mounted light source to expose one section of each film unit and a lens and shutter system to expose the other section of the film unit.

A U.S. Pat. No. to Johnson et al., 4,7007,106, discloses a lens masking technique to obtain multiple images on a single film unit but all exposures occur after the film cassette is mounted in the camera.

A U.S. Pat. No. to Doyle, 4,816,848, discloses mounting an image bearing template in the focal plane opening of a film cassette to provide indicia on film units when they are exposed for the first time.

A U.S. Pat. No. to Guez, 4,827,291, discloses masking and exposing each frame of a roll of negative film while it is in a camera, rewinding the exposed roll, providing a different mask and exposing each frame a second time while simultaneously preventing exposure of the pre-exposed portion of the film. All masking and exposures take place while the roll of film is in the camera.

A U.S. Pat. No. to Barrett, 4,896,176, discloses placing a transparency within a cassette overlying a self-developing film unit. Each film unit receives reflected light from a flash unit, which light reflects from the back side of an external screen through the camera lens. The reflected light exposes the film unit around its edges and thereby produces an edge design as desired by the photographer. The edge design is supplied by an overlay located inside the camera at a location between the lens and the film unit. The central portion of the film unit is simultaneously exposed to image bearing light for recording the subject before the camera. Exposure of the film unit occurs only once when the photographer activates the shutter.

A U.S. Pat. No. to Spector, 4,994,832, includes a disclosure of pre-exposing a film unit at some period of time prior to the time the film unit is exposed a second time to capture the image of the desired subject. The technique used by Spector is not one of using a mask over a portion of the film unit, but rather exposing the whole film unit frame twice, first by an under-exposure based on light and timing and later by a full exposure of the primary object to be photographed. The '832 camera requires a strip of transparency film which must be moved through the camera's viewfinder. Each frame of the transparency strip includes a visible image of the subject which was the result of the pre-exposure. The operator, while looking through the viewfinder, positions the visible pre-recorded image of the subject with the object to be photographed and then actuates the shutter release button.

What the background information as set out above does not disclose is appropriate apparatus and procedural steps for pre-exposing the frames of a film strip with the same background or peripheral indicia on each frame during the manufacturing process 1) prior to the time the film strip is severed from an endless strip or web of film and 2) before the severed strip is attached to wind-up spool and positioned in a film cassette or a camera of the disposable type.

SUMMARY OF THE INVENTION

During the manufacturing process of this invention an endless strip of individual film units or frames is produced in conventional fashion. Each frame of the strip is subsequently masked and exposed to light which passes through nonopaque areas of the mask in order to expose the underlying film to an image contained on said nonopaque areas of the mask. The mask prevents exposure of one portion of the film unit while a different portion of the film unit is exposed to said image on the mask.

The image provided by this pre-exposure may be any desired configuration including a Christmas or holiday greeting, something in relation to an athletic event, advertising indicia, a vignette and the like. The location and configuration of the portion of the film unit exposed to the first image bearing light is an option available to the manufacturer of the film unit because each of the film units in the ultimately supplied strip of film units has the same pre-exposed latent image at the same location on each film unit or frame.

After the pre-exposure of each film frame to the same image, the film strips are severed to provide, for example, twelve, twenty-four or thirty-six frames on a severed strip. Then one end of a strip is secured to a wind-up spool and together they are mounted in a conventional single use or disposable camera suitable for film of the type being used. In other cases the film strip is mounted in a cassette prior to its being mounted into a camera.

What is not conventional, in the case of a disposable camera, is the shape of the focal plane opening of the camera in relation to the film frame in the camera. The camera's focal plane opening is bordered by a mask formed from opaque material. Said border serves to mask the pre-exposed area of the film unit such that a second exposure of the film unit to image bearing light while within the camera impinges on the film unit only in the area not previously exposed. In the case of the pre-exposed roll of film being located within a film cassette, e.g., 110 or 126 film cassette, the configuration of the cassette's exposure or focal plane opening is such that is prevents further exposure of the pre-exposed portion of the film frame while simultaneously permitting the exposure of the nonexposed areas of the frame.

The means for effecting the particular configuration of the focal plane opening may be accomplished in three separate ways. By far the simplest way is to form the cassette with its opening exactly in the shape desired. A second way is to provide a separate sheet or template of plastic fitted into place with the normal rectangular focal plane opening in a conventional cassette. A third way is to have a similarly shaped sheet of plastic secured to the focal plane opening of the camera at a location juxtaposed to the film frame. The first two ways are disclosed in the aforementioned Olson et al. application.

Whether the cassette opening is integrally formed during manufacture or is modified by the application of a sheet of partially opaque plastic or other material, the result is the same. The pre-exposed areas of the individual film unit are masked or screened from the second exposure and subsequently both latent images are developed when the twice exposed film unit is processed in conventional fashion.

In order for the invention to work properly, the first frame on the film strip must be aligned precisely with the mask used with the second exposure. With a single use camera the first frame is assembled in the camera by the manufacturer; thus, alignment indicia are read by the assembly apparatus and initial alignment of the first frame is achieved. On the other hand, where the film strip is in a cassette and the cassette is to be mounted in a camera by the photographer, the first frame is not located in alignment with the cassette's exposure opening at the time the cassette is inserted into operative position within the camera; accordingly alignment may be achieved by aligning indicia on 1) the leader of the film strip with a mark on the film take-up spool such that a predetermined number of revolutions of the spool will bring the first frame of the strip of film into alignment with the film cassette's exposure opening.

Objects of the invention and the scope of applicability of the present invention will become apparent from the detailed description to follow taken in conjunction with the accompanying drawings in which like parts are designated by like reference characters.

BRIEF DESCRIPTION OF THE DRAWINGS

For a fuller understanding of the nature and objects of the invention, reference should be had to the following detailed description taken in connection with the accompanying drawings wherein;

FIG. 8 is an exploded view of the camera and pre-exposed film strip as they would appear during assembly at the manufacturer.

Figure 1:
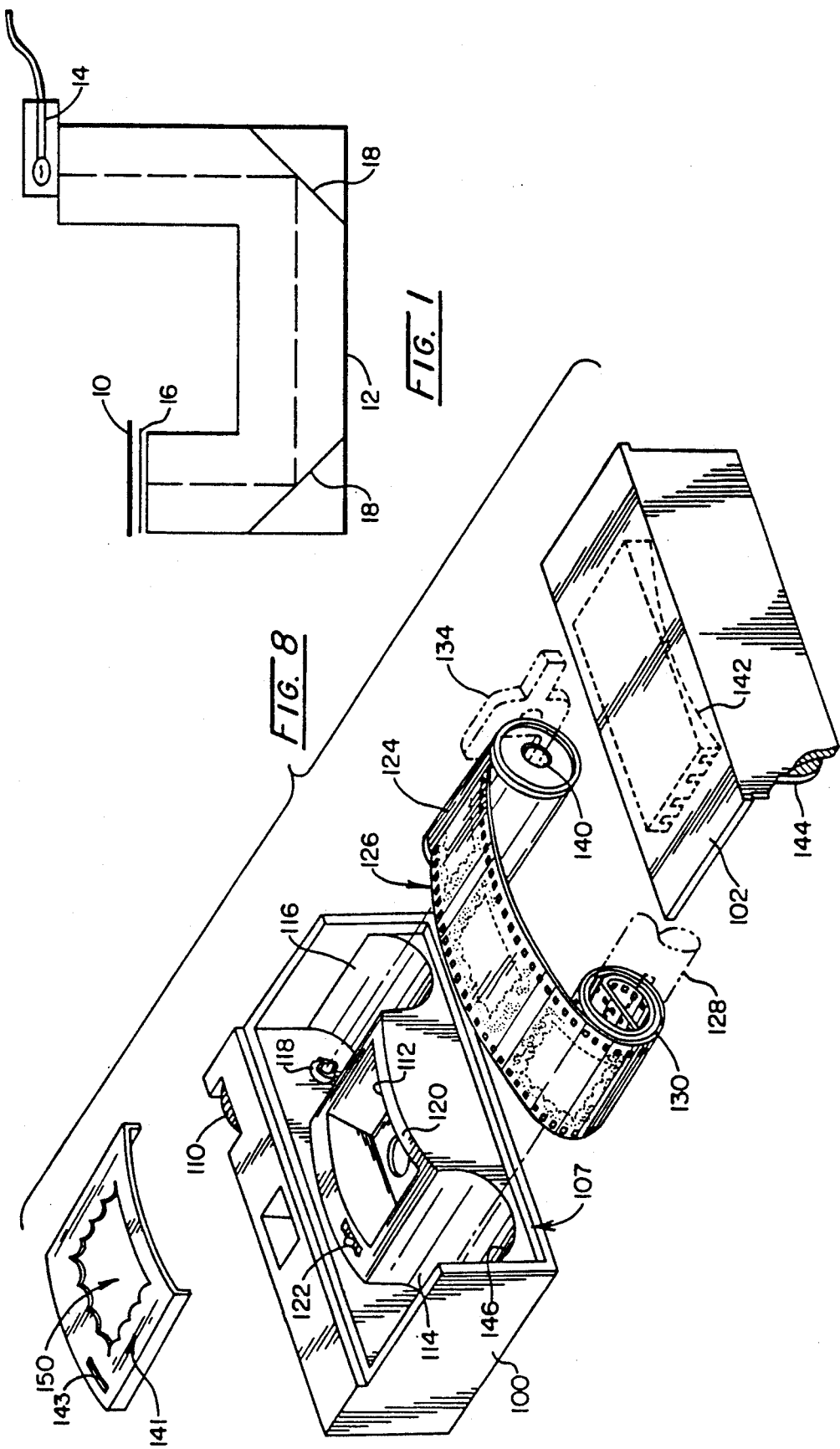
FIG. 1 is a diagrammatic illustration of apparatus for pre-exposing a portion of each frame of a length of film to the same image during manufacture.

In describing the preferred embodiments of the invention, which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, secured or terms similar thereto are often used. They are not limited to direct connection but include connection through other elements where such connection is recognized as being equivalent by those skilled in the art

DETAILED DESCRIPTION OF THE PREFERRED EMBODIMENTS

The final product to be produced according to this invention in its preferred embodiments is a photograph processed in conventional fashion after a roll of film is located within a camera and subsequently exposed. Around the border of the resulting photograph is a particular design or pattern pre-selected by the photographer at the time the film strip is purchased, i.e., the film manufacturers may have several types of film available for sale, with each film type containing a different pre-exposed theme. The main subject of the ultimate photograph is selected on site by the photographer as exposures are made in conventional fashion. The pre-selected design or theme around the periphery of each photograph results from pre-exposing that area of each film frame prior to the time that the film strip is purchased and mounted within the camera.

The preferred embodiments include designs provided by the manufacturer around the periphery of the photograph. The manufacturer of the rolls of film may select any particular design or physical placement of the design on the individual film units which is desirable at the time. It may be that the pre-exposed area of each of the film units is pre-exposed along one rectangular edge, two of the edges, three edges or all four; it all depends on how the product is manufactured in the first place.

FIG. 1 diagrammatically illustrates one step of the manufacturing process wherein a length of film 10, manufactured in conventional fashion, is pre-exposed to image bearing light during the manufacturing process and preferably before the film is severed into individual strips bearing a designated number of frames for subsequent exposure in a camera. The film 10 passes over one end of a light tunnel 12 having a strobe light 14 at one end and an image bearing template or mask 16, preferably acetate, at the other end. The template includes an opaque section and an image bearing section through which light is adapted to pass. The tunnel may contain one or more mirrors 18 to reflect light from the strobe 14 through the template 16 to provide an image bearing light impinging on a portion of the strip of film 10.

Template 16 includes the opaque section (not shown) which serves to mask the film strip 10 from exposure to light 14 while allowing a first portion of the film frame to receive the image bearing light passing through the nonopaque section of the template 16. The image received by the film strip 10 from the passage of light rays to the unmasked portion of the film unit is the image imprinted on the template 16.

A plurality of frames of the film 10 are exposed to the identical image which will remain latent because it will not be subjected to developer liquid until much later, as will be explained subsequently.

Figure 2:
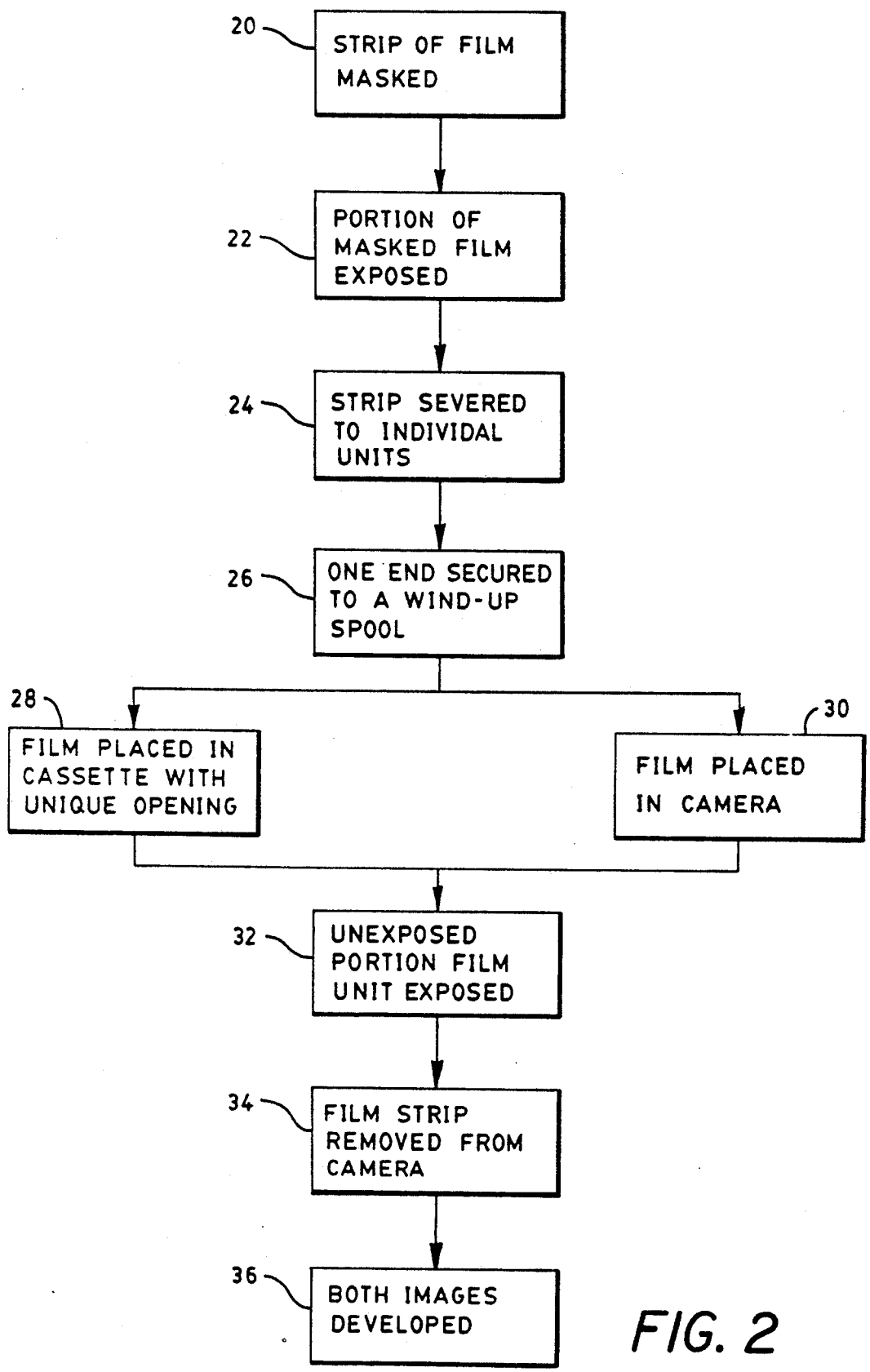
FIG. 2 is a block diagram illustrating the procedural sequence of producing a desired photograph according to this invention.

FIG. 2 illustrates a procedural sequence for producing the desired photograph according to this invention and it begins at 20 which is the point in the manufacturing process illustrated in FIG. 1 where the strip of film 10 is masked by the template 16. The second step 22 involves the exposure of the unmasked portion of the film to light from the strobe 14 which passes through the nonopaque portion of the template 16. At 24, the strip is severed to provide individual film strips, each frame of which includes a latent image of the design on the template 16. The severed film strip has one end secured to a wind-up spool at 26 and together they are mounted in a cassette at 28 or in a camera at 30. What is not conventional is the shape of the focal plane opening in the camera or the exposure or focal opening in the cassette.

During the manufacturing process and prior to the time the film strips are placed in the cassette, the cassette is preferably supplied having a unique focal plane or exposure opening. The opaque material defining the shape of the focal plane opening covers the pre-exposed areas of the film unit bearing the pre-exposed latent image such that light subsequently impinging on the film unit or frame does so at a location which has not been previously exposed. The cassette with the unique opening 30 may be an integral plastic opaque box which will be described in more detail subsequently. Alternatively, the shape of the focal plane opening may be modified by attaching a partially opaque sheet of plastic in superposition with the exposure opening in the cassette. The same may apply to the disposable camera, i.e., the camera's exposure plane defining structure may be molded such that the pre-exposed portion of the film frame will not be exposed during a subsequent exposure of the frame or, this structure may be modified by a mask as shown in FIG. 8.

After the film strip is placed in the camera or in the film cassette, the camera or cassette packaging may be labeled appropriately to indicate the pattern or design of the pre-exposed latent image or indicia borne by each of the frames of the film strip. The cassette is subsequently mounted in a conventional camera, e.g., of the 110 or 126 type and the unexposed portion of the film frame in either the conventional or disposable camera is exposed at 32.

After all of the frames are exposed for the second time the film cassette is removed from the camera and sent to a processor for development in the conventional fashion. In the case of the disposable camera the entire camera is sent to a processor for development of the film.

Figure 3:
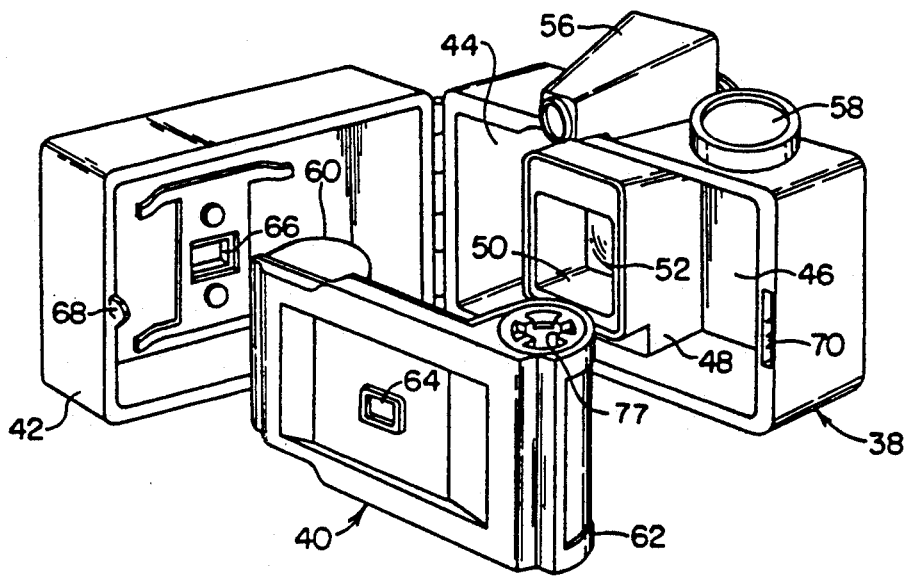
FIG. 3 is an exploded view of a camera and film cassette used in one embodiment of this invention.

A conventional camera suitable for use with one preferred embodiment of this invention is illustrated in FIG. 3. This camera includes a main body housing 38, a roll film cartridge or cassette indicated generally at 40, and a hinged cover 42. The main body 38 has recessed chambers or cavities at each end indicated at 44 and 46, respectively. Located centrally of the camera body, is a boxlike member 48, which has an opening at 50, and includes a lens means 52 for admitting light to the film plane by means of a shutter (not shown).

A film metering pawl (not shown) is also included as part of the boxlike member 48, with a viewfinder indicated at 56, and a manual film advancing knob being identified at 58. A battery-powered mechanical advancing means may be included as an alternative.

The roll film cartridge 40 is preferably fabricated from molded plastic components, sealed or glued together in any convenient manner to provide a lighttight arrangement, having a film supply chamber indicated generally at 60 at one end, and a film take-up chamber indicated generally at 62 at the opposite end. The roll film cartridge 40 has a window at 64, which is adapted to cooperate with a similar aperture 66 in the hinged cover 42, so as to enable the camera user to determine how many film frames have been exposed.

Cameras of the type shown in FIG. 3 are adapted to advance the strip of film, frame by frame, by actuation of the film advance knob 58 in cooperation with the aforementioned metering pawl. As is well known in the art, actuation of the knob 58 in a counterclockwise manner is effective to cause an attached drive member (not shown), which is located in driving relation with a notched end 77 of a film wind-up spool 78, to advance the film strip by one frame only. At this time the metering pawl will prevent further movement of the film strip until a subsequent actuation of the camera's shutter. Thus, in order to insure that the first frame of the film strip containing the pre-exposed indicia is accurately located in alignment with the film cassette's exposure opening 92 when the number "1" appears in the window 66, the leader of film strip (which is attached to the spool 78) is provided with a mark (not shown) which is to be aligned with a mark 79 on, e.g., an inwardly facing surface of one of the flanges of the spool 78 during attachment of the film strip to the spool 78. The distance between the mark on the film strip and the first film frame would be a multiple of the width of each film frame and the distance that the film would be advanced for each actuation of the knob 58 may be equal to the width of a film frame. Thus, after the film cassette has been loaded into the camera, the knob 58 and the shutter are actuated one or more times until the numeral "1" appears in the window 66. At this time the first film frame will be in proper registration with the exposure aperture 92 and the opening 50 in the camera.

When the camera is loaded, preparatory to picture taking, the cartridge 40 is inserted in the main body 38, the film supply chamber 60 being adapted to fit into the recess 44, and the film take-up chamber 62 being adapted to fit within the recess 46. The camera is then locked in lighttight arrangement, the hinged cover 42 closing upon the main body 38 and locking by means of the latch 68 on the hinge cover 42, engaging with the locking recess 70 on the main body housing 38.

Figure 4:
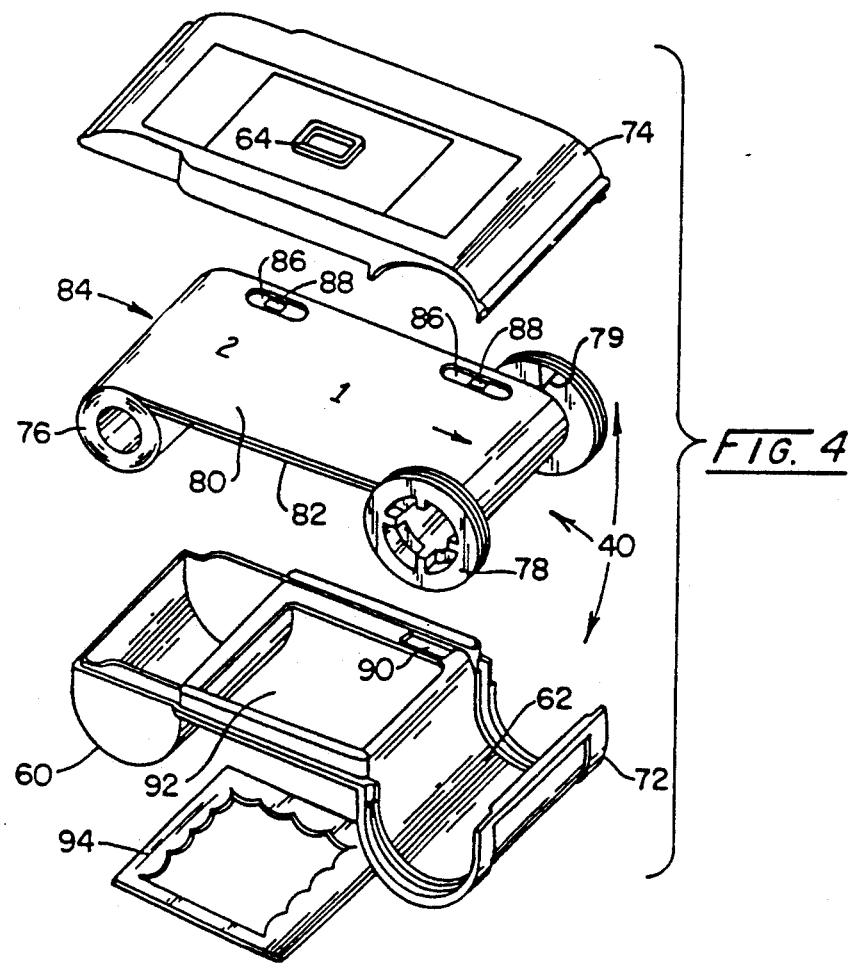
FIG. 4 is an exploded view of the film cassette of FIG. 3.

Considered in connection with FIG. 4, the molded film cassette 40 comprises a molded plastic cartridge body 72, a molded plastic cartridge cover or rear wall 74, a film supply roll 76, and the wind-up spool 78 having one end of the film strip attached thereto. A strip of light protective paper 80 provides backing for the photographic film 82. In assembling the cartridge, the protective paper 80 and photographic film 82 are initially wound upon the film supply roll 76, and then its leader is attached to the wind-up spool 78. The backing paper 80 includes film frame identifying numeration as indicated generally at 84. The backing paper has a series of elongated openings, such as indicated at 86 on one edge, which cooperate with similar openings 88 respectively on the film 82. The openings 88 are engageable by the metering pawl. The cassette body 72 includes an elongated slot 90 adjacent a large recessed opening 92 which opening 92 defines the overall dimensions of the frame of the negative to be exposed. As previously indicated, in the fabrication stage, the roll film spool 76 is placed within the chamber 60, the take-up spool 78 in the chamber 62 and the cover 74 then being placed against the molded plastic part 72 in mating engagement, the entire molded plastic cartridge being then sealed by any convenient means, such as heat or adhesive material to provide a lighttight roll film cartridge.

In conventional arrangement, the metering pawl is adapted to fit within the aperture 90 in the body member 72, and into one of the apertures 86, which is approximately in register with an aperture 88 on the film 82, the film being advanced after each exposure by rotation of the knob 58.

In step 28 illustrated in FIG. 2, the cassette 40 is identified as bearing a unique opening at the aperture or exposure opening 92. The shape of the exposure aperture 92 is defined by the shape of the pre-exposed portion of each film frame in procedural step 22. The unique shape may be formed integral with the cassette body 72 or alternatively as shown in FIG. 4, as a mask 94 secured in superposition to rim of the rectangular aperture 92 subsequent to assembly of body 72 with the film strip 80 and the cover 74.

Figure 5:
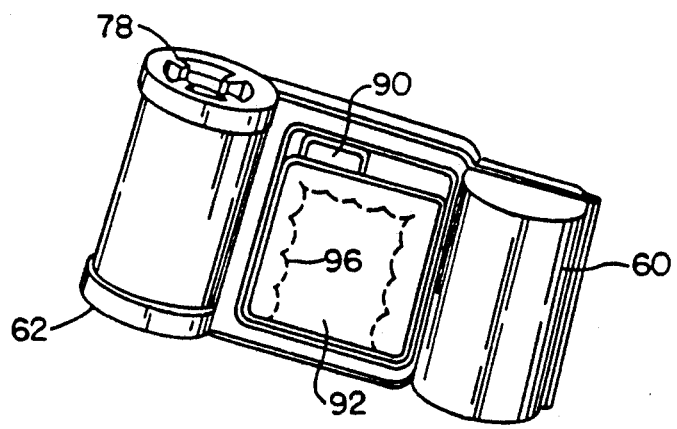
FIG. 5 is a perspective view of the cassette of FIG. 4 showing the focal plane opening without the mask.

FIG. 5 shows the assembled cassette 40, without the mask 94 in place, with a film frame in alignment with the aperture 92. The dashed lines 96 illustrate the outline of the latent image formed on the film frame at step 22 of the maufacturing sequence of FIG. 2. It will be noted that this outline conforms with that of the mask 94.

Figure 6:
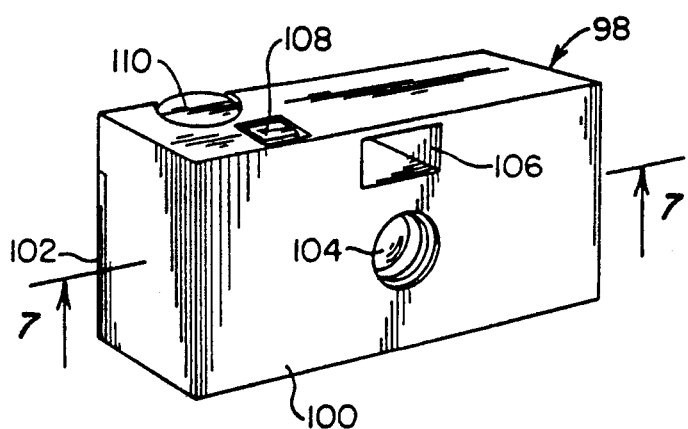
FIG. 6 is a perspective view of a preferred embodiment of a single use camera usable with this invention.

Referring now to another preferred embodiment, FIG. 6 shows a lens-fitted photographic film package 98 or single use camera (which is hereinafter referred to as a film package for simplicity) which comprises a main front body section 100 and a back cover section 102 which forms a lighttight box-shaped film container. The main front body section 100 is provided with a taking lens 104, a finder window 106, and a shutter actuating member 108 in its outer walls, and necessary photographic mechanisms such as a shutter mechanism, a film advancing mechanism, and the like incorporated therein. The back cover section 102 is fixed to the main front body section 100 in any well known manner, for example by means of ultrasonic welding, so as not to be removed by the user. A film advancing knob 110 projects from the top of the body.

In FIG. 8 showing the film package disassembled into two sections, the main front body section 100 has an opening 107 extending between its back and bottom. The back cover section 102 is shaped to complementarily close the opening 107 of the main front body section 100 so as to provide the lighttight box-shaped film container. Inside the main front body section 100, there are a film roll receiving cavity 114 and a film canister or cassette receiving chamber 116 disposed on opposite sides of an exposure frame 112. Projecting from the top wall of the film canister receiving chamber 116 is a fork 118 which is rotatable by the external film advancing knob 110 in the clockwise direction as viewed in FIG. 8. The exposure frame 112 is formed with film guiding and supporting tracks 120 on both sides thereof. In one of the tracks 120, there is a sprocket wheel 122 of a metering pawl partially projecting out of the surface.

When assembling the film package 98, a mask 141 is attached to and positioned over the track 120 and a roll 130 of film 126, preferably 35 mm, is held at its end by a member 128 and a cassette 124 by a member 134. The members 128 and 134, which are part of the assembly mechanism, are moved forwardly to place the roll 130 and cassette 124 in receiving chambers 114, 116, respectively. After the roll 130 and cassette 124 have been so located, the member 128 is rotated in a direction which will wind the film 126 into a larger roll while simultaneously withdrawing it from the film cassette 124. Rotation of the member 128 is stopped when it senses a predetermined increase in resistance to further withdrawal of the film from the cassette 124 thereby insuring that the film's leader stays attached to the film take-up spool 140. A mark on the film strip, which is indicative of one lateral side of the first frame, is then aligned with a corresponding mark on the camera 98 to thus locate the first film frame in alignment with the opening 112. The members 128 and 134 are then withdrawn and the two camera body sections 100 and 102 sealed to each other. When the camera is operated to expose the film by normal shutter actuation, the withdrawn film strip is advanced back into the lighttight film cassette 124.

In this disposable camera 98 the assembly of the component parts takes place in a lighttight environment, at least to the extent of withdrawing the pre-exposed film 126 from the cassette 124 before it is sealed between body 100 and back 102. The manner of accomplishing this is well known in the art. The pre-exposed film 126 is withdrawn from the cassette 124 and formed into a roll 130 prior to the sealing of the camera parts. The first frame for exposure is precisely aligned with the shape of a mask 141 which fits over the exposure frame 112 and rests on the supporting tracks 120. The mask 141 includes a slot 143 for allowing rotation of the metering pawl's sprocket wheel 122 and the exposure aperture 150. As each frame is exposed for the second time the film 126 is retracted into the cassette 124 and each subsequent frame is inherently precisely aligned with mask 141 by the internal camera structure, including the metering pawl 122, which stops the film after an exact length of film has been moved by rotation of the knob 110.

Inside the back cover section 102, there is a back-up portion 142 shaped complementarily to the shape of the guide tracks 120 of the exposure frame 112 for pressing the film against the tracks 120 so as to place it in the focal plane of the taking lens 104. There is also a raised portion 144 formed on the bottom of the back cover section 102 which closes the opening 146 of the film roll receiving chamber 114 and supports the lower edges of the convolutions of the rolled film 130. The curved form the tracks 120 helps reduce distortion where a plastic lens is used but tracks 120 may be planer between cavities 114 and 116 if desired.

Figure 7:
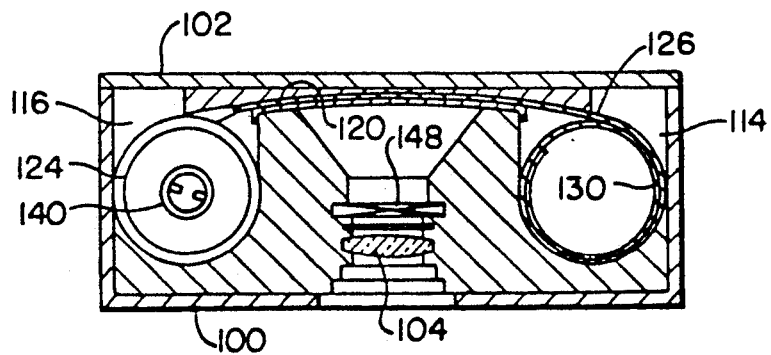
FIG. 7 is a sectional view taken along line 7—7 of FIG. 6.

In using the film package thus assembled, when the shutter actuating member 108 is operated, a shutter 148 (see FIG. 7) is opened and closed so as to expose a frame of the film 126 placed over the exposure frame 112. As light enters via the lens 104 and shutter 148, only that which passes through the exposure aperture 150 in the mask 141 will strike the underlying film frame in its previously unexposed area. The material of the mask which defines the exposure aperture 150 is opaque and is adapted to overlie the pre-exposed areas of the film frame to prevent further exposure of the same. After the exposure, the film advancing knob 110 is operated to rotate the fork 118, thereby rotating the spool 140 in the cassette 124 so as to wind the film by one frame, namely to draw the exposed part of the film toward the canister 24. At the same time, a new frame of the film 126 is advanced to the exposure frame 112 and stopped there by the sprocket 122. When the sprocket 122 makes a predetermined number of revolutions during advancement of the exposed film frame, the film advancing knob 110 and the shutter 148 with its associated elements are self-cocked so as to set the film package for the next exposure.

As the exposure is repeated in the same manner as described above, the film 126 is progressively drawn into the cassette 124. After the exposure of all frames of the film 126, the film package 98 is forwarded to a photo-shop for processing of the exposed film. Alternatively, the back cover section 102 may be detached from the main front body 100 so as to remove the cassette 124 containing the exposed film 126. The cassette 124 is handled in the same manner as is conventional for removing exposed film and subjecting it to the necessary processing for development and printing.

While certain preferred embodiments of the present invention have been disclosed in detail, it is to be understood that various modifications may be adopted without department from the spirit of the invention or scope of the following claims.

What is claimed:

1. A method for producing a composite image in a strip of negative film comprising:
   (a) providing a strip of negative film comprising a plurality of exposure frames;
   (b) directing a source of light toward the negative film;
   (c) positioning a mask between the strip of negative film and the source of light, the mask containing opaque and non-opaque sections with the non-opaque section containing an image adapted to be photographically reproduced in each of said frames as a first latent image;
   (d) energizing the source of light such that it strikes and passes through the non-opaque sections of the mask to thereby transfer the image thereon onto adjacent portions of a frame of the negative film as a first latent image while the opaque section of the mask prevents the light from exposing other adjacent portions of the frame;
   (e) sequentially moving non-exposed frames of the negative film into alignment with the mask and repeating step (d) until substantially all of the frames in the negative film have been provided with a first portion containing a first latent image by being exposed to the image in the non-opaque sections of the mask, and a second unexposed portion;
   (f) attaching one end of the negative film strip to a spool and forming the opposite end of the strip into a coil;
   (g) forming a housing having two film holding cavities straddling an exposure frame opening, the exposure frame opening being configured to prevent the exposure of the first portion of the frames of the strip of negative film which contain the first latent image while permitting the exposure of the second unexposed portion of each of the frames;
   (h) mounting the negative film strip and spool in the housing with the spool being positioned in one of the cavities and the coil in the other cavity;
   (i) aligning the first frame with its second unexposed portion in alignment with the exposure frame opening such that when the first frame is subsequently subjected to image bearing light rays passing through the exposure frame opening, such light rays will strike only the unexposed portion of the first frame to provide a second latent image in the frame which is separate from the first latent image;
   (j) sequentially aligning adjacent frames in the negative film strip with the exposure frame opening and exposing the unexposed portions thereof to image-bearing light rays so as to provide second latent images therein while simultaneously preventing the exposure of the first latent image to the same image bearing light rays; and
   (k) simultaneously developing the first and second latent images to form a composite photograph.

2. A method as defined in claim 1 wherein the exposure frame opening of the housing is configured to prevent the further exposure of the first latent image by placing a mask across the opening, the mask including an opaque section for preventing the exposure of the first latent image in the frame to image-bearing light rays passing through the opening while simultaneously allowing such light rays to strike the unexposed portion of the frame of negative film.

3. A method as defined in claim 1 wherein the exposure frame opening is integrally formed as part of the housing.

4. A method as defined in claim 1 wherein the housing is constructed as a disposable camera.

5. A method as defined in claim 4 further including the step of positioning the spool within a cylindrical film cassette and winding a portion of the strip of negative film into the film cassette after each exposure of the unexposed portion of each frame.

6. A method as defined in claim 1 wherein the housing is constructed as a film cassette adapted for use in a conventional amateur camera.

7. A method as defined in claim 6 further including the step of forming the exposure frame opening with a periphery corresponding to the periphery of the unexposed portion of each frame of the strip of negative film.

8. A photographic package comprising:
   a disposable camera having means for defining (a) two film holding cavities and (b) an exposure frame opening located intermediate said cavities, and a film cassette having a take-up spool rotatably supported therein and adapted to be supported within one of said cavities;
   a roll of negative film comprising a plurality of individual frames, said film having one end secured to said film take-up spool within said film cassette and its opposite end formed into a coil, said coil being adapted to be supported within the other of said cavities with said negative film overlying said exposure frame opening, each of said frames including a portion which has been pre-exposed during its manufacture to provide an exposed portion containing a first latent image and an unexposed portion, a first frame of said negative film being aligned with said exposure frame opening, during assembly of said roll and said camera at the manufacturer; and means for configuring said exposure frame opening such that the periphery of said opening corresponds with the periphery of said unexposed portion of said frame so as to prevent further exposure of said first latent image during the forming of a second latent image in the unexposed portion of said frame by image carrying light rays passing through said exposure frame opening during an exposure.

9. A photographic package as defined in claim 8 wherein said exposure frame opening of said camera is defined by a mask positionable during manufacture of said camera between the camera's objective lens and said frame of said strip of negative film, said mask having an exposure aperture.

10. A photographic package as defined in claim 9 wherein said camera further including means for winding a portion of said negative film into said film cassette after each exposure of a frame, and metering means for stopping the winding of said film when the next frame is located in alignment with said exposure frame opening.

11. A photographic package as defined in claim 10 wherein said mask includes a slot for receiving a portion of said metering means.

12. A photographic film assemblage for insertion into a conventional camera comprising:
a film cassette comprising first and second housings, said first housing including a film supply chamber, a film take-up chamber, and an exposure frame opening located intermediate said film supply chamber and said film take-up chamber, and said second housing including a viewing window;
a film wind-up spool rotatably supported within said film take-up chamber;
a strip of negative film having opposite ends, one of said ends being attached to said film wind-up spool and its other end formed in a coil and being located in said film supply chamber with an intermediate length of said negative film extending across said exposure frame opening, said strip of negative film comprising a plurality of frames each of which includes a portion, which has previously been exposed during its manufacture so as to provide a first latent image therein, and an unexposed portion;
a strip of opaque material secured in face-to-face relation to one side of said strip of negative material to prevent the inadvertent exposure of said strip of negative material to light entering said cassette via said viewing window in said second housing, said strip of opaque material having indicia of a side thereof which faces said viewing window and which is adapted to be moved into alignment with said viewing window for indicating the number of the film frame which is located in alignment with said exposure frame opening; and
means for configuring said exposure frame opening so as to prevent the further exposure of said exposed portion of each of said film frames while simultaneously allowing the exposure of said unexposed portion of said film frame to image bearing light rays passing through said exposure frame opening during its exposure within a camera so as to provide a second latent image within said film frame.

13. A photographic film assemblage as defined in claim 12 wherein said configuring means comprises a mask formed from an opaque material and having an opening therethrough whose periphery substantially corresponds to the periphery of said unexposed portion of said film frame.

14. A photographic film assemblage as defined in claim 12 further including alignment means adapted, during attachment of said strip of negative film to said wind-up spool, to be located in juxtaposition with a corresponding means on the end of said strip of negative film attached to said film wind-up spool for insuring that the first frame of said strip of negative film is located in alignment with said exposure frame opening.

15. A photographic film assemblage as defined in claim 14 wherein said alignment means is located on said film wind-up spool.

* * * * *

UNITED STATES PATENT AND TRADEMARK OFFICE
CERTIFICATE OF CORRECTION

PATENT NO. : 5,187,512
DATED : February 16, 1993
INVENTOR(S) : George F. Kirkendall It is certified that error appears in the above-identified patent and that said Letters Patent is hereby corrected as shown below:

Title page, in the line designated "[22]", "1990" should be ---1991---.

Signed and Sealed this

Thirteenth Day of April, 1999

Attest:

Q. TODD DICKINSON

*Attesting Officer*  *Acting Commissioner of Patents and Trademarks*